3,382,229
POLYSACCHARIDE RECOVERY PROCESS
John T. Patton and Willis E. Holman, Tulsa, Okla., assignors, by mesne assignments, to Esso Production Research Company, Houston, Tex., a corporation of Delaware
Filed Apr. 11, 1963, Ser. No. 272,342
12 Claims. (Cl. 260—209)

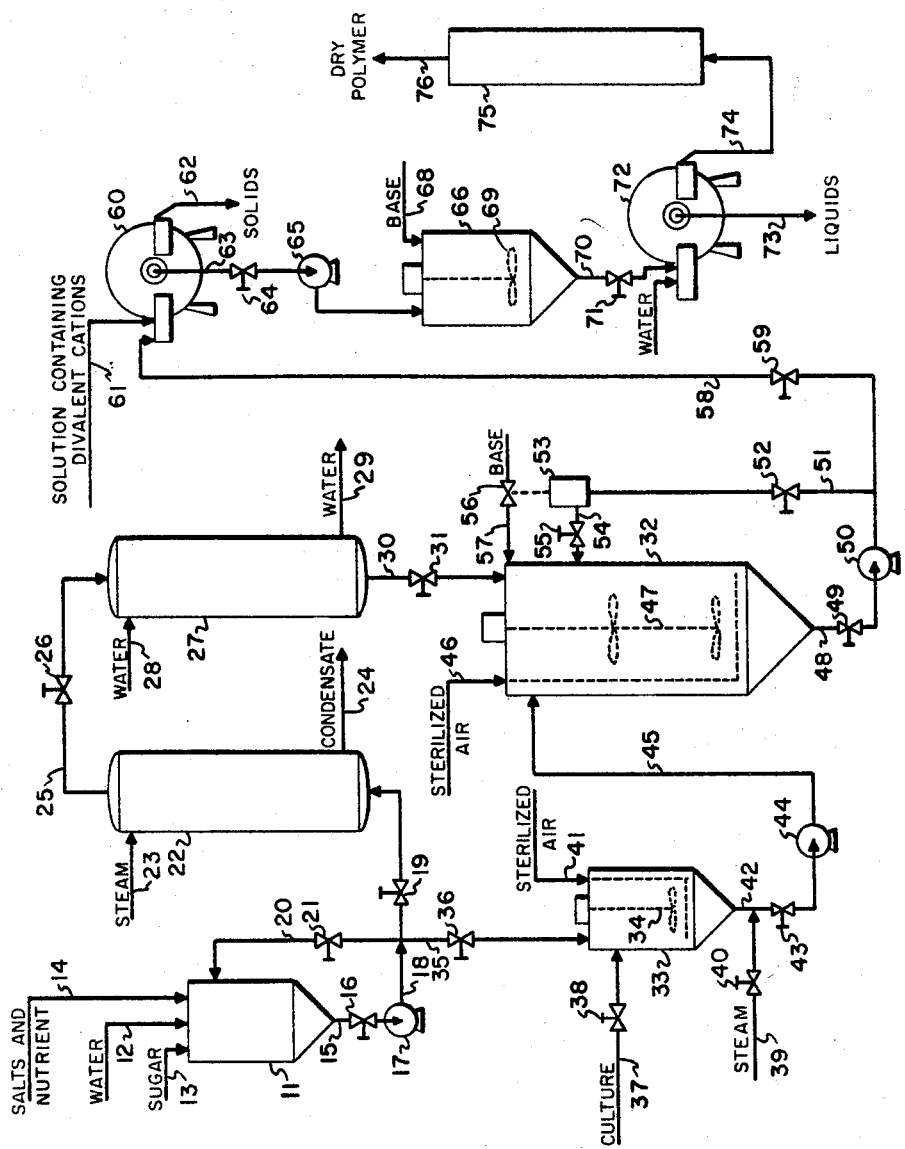

The present invention relates to polysaccharides and is particularly concerned with an improved process for the recovery of heteropolysaccharides derived from carbohydrates by the action of bacteria of the genus Xanthomonas.

Earlier work has shown that heteropolysaccharides produced by the action of bacteria of the genus Xanthomonas on carbohydrates can be employed for the formation of films, are useful as thickening or bodying agents in edible products, cosmetic preparations, pharmaceutical vehicles and similar compositions, and may be utilized as emulsifying, stabilizing and sizing agents. The development of these applications has been slow, partially because of the cost of producing the heteropolysaccahrides. The process normally employed results in the formation of a thick, highly viscous fermentate containing bacterial cells, unconverted carbohydrates and other materials in addition to the desired polymer. This fermentate is diluted with water and methanol or a similar organic solvent to reduce its viscosity and permit removal of the bacterial cells and other insolubles by centrifugation. Additional methanol and a substantial quantity of potassium chloride are then added in order to flocculate the heteropolysaccharide in the form of the potassium salt. This salt is recovered in a second centrifugation step. If the substantially pure salt of the polymer is desired, the material may be re-dissolved, re-precipitated and again centrifuged. The product is then washed with methanol or a similar solvent and dried to obtain the polymer in powdered form. Studies have shown that these recovery steps account for much of the total cost of producing the heteropolysaccharide.

The present invention provides a new and improved process for recovering heteropolysaccharides derived from carbohydrates by the action of bacteria of the genus Xanthomonas. In accordance with the invention, it has now been found that the cost of isolating such polysaccharides can be reduced by precipitating the polymers with polyvalent cations in alkaline solution. Experimental work and laboratory studies have shown that the polyvalent cations react with the heteropolysaccharide molecules to form products which are insoluble in aqueous media at high pH levels. The use of this reaction to recover the polymers obviates the necessity for employing methanol or a similar organic solvent, simplifies recovery of the precipitated material, and facilitates repeated precipitation and washing of the polymer if desired. The process therefore has pronounced advantages over methods utilized in the past.

The nature and objects of the invention can best be understood by referring to the following detailed description of the heteropolysaccharide recovery process and to the attached drawing illustrating that process.

The apparatus depicted in the drawing includes a vessel 11 in which the fermentation medium used for the production of the heteropolysaccharide is prepared. The water employed in formulating the medium is introduced into the system through line 12. The carbohydrate used as the substrate is added through line 13. A variety of different carbohydrates can be fermented with Xanthomonas organisms to produce the heteropolysaccharides. Suitable materials include glucose, sucrose, fructose, maltose, lactose, galactose, soluble starch, cornstarch and the like. Fermentation studies have shown that the carbohydrate employed need not be in a refined state and may instead be utilized in the form of a crude material derived from natural sources. Specific examples of such materials include raw sugar, crude molasses, sugar beet juice, raw potato starch and the like. These materials are generally much less expensive than the corresponding refined carbohydrates and are therefore normally preferred for preparation of the heteropolysaccharides.

A bacterial nutrient may be added to vessel 11 through line 14 in order to complete the fermentation medium. The nutrient, if employed, will normally be a by-product material such as distiller's solubles containing organic nitrogen sources and suitable trace elements. Dipotassium acid phophate may also be added through line 14. The use of a nutrient and dipotassium acid phosphate is not essential in all cases. Experience has shown that many of the crude carbohydrate source materials contain organic nitrogen, trace elements and other constituents needed for effective fermentation by the Xanthomonads and that such materials can therefore be utilized without the addition of other components. Excellent results have been obtained, for example, by employing raw sugar beet juice without any additional nutrient.

The aqueous medium prepared in vessel 11 will normally contain the carbohydrate in a concentration of from about 1 percent to about 5 percent by weight. The dipotassium acid phosphate and nutrient, if used, will generally be employed in concentrations of from about 0.1 to about 0.5 percent and from about 0.1 to about 10 percent by weight respectively. The most effective concentration for a particular fermentation will depend to some extent upon the constituents employed in the medium, the fermentation conditions, and the strain of bacteria used and hence these concentrations may be varied considerably.

Following formulation of the fermentation medium in vessel 11, the resulting aqueous solution is sent through line 15 containing valve 16 to a pump 17. The pump is utilized to circulate the medium through line 18 containing valve 19 into the sterilization stage of the process. A recycle line 20 containing valve 21 is located down-stream from the pump in order to permit recirculation of the medium into the mixing vessel 11 if desired. The sterilization unit employed comprises a heat exchanger, a jacketed vessel, a vat provided with an electrical heater or similar apparatus 22 within which the fermentation medium can be heated to a temperature within the range between about 200° F. and about 275° F. and held at that temperature for a period of from about 2 to about 5 minutes or longer. Higher temperatures and longer residence time may be employed if desired but in general the temperatures and time indicated above will be sufficient to kill any bacteria present in the medium and render it sterile. The sterilization unit shown in the drawing comprises a heat exchanger into which steam is introduced through line 23 and from which condensate is withdrawn through line 24.

The sterilized medium is withdrawn from the sterilization unit at a temperature between about 200° F. and about 275° F. through line 25 containing valve 26 and is passed into cooling unit 27. The cooling unit represented in the drawing is a heat exchanger into which water or a similar cooling fluid is introduced through line 28 and subsequently withdrawn through line 29. A jacketed vessel, a vat containing cooling coils or other conventional cooling apparatus may be utilized in lieu of such a heat exchanger. The temperature of the fermentation medium is dropped within the cooling unit to a point between about 75° F. and about 100° F., preferably to a temperature between about 75° F. and about 85° F. The cooled, sterile medium is then discharged through line 30 containing valve 31 into fermentation vessel 32.

Fermentation of the medium within vessel 32 is carried out by means of an innoculum containing *Xanthomonas campestris* or similar organisms. Representative species of the genus Xanthomonas which may be utilized for producing the heteropolysaccharides include *Xanthomonas begoniae, Xanthomonas campestris, Xanthomonas carotae, Xanthomonas hederae, Xanthomonas incani, Xanthomonas malvacearum, Xanthomonas papavericola, Xanthomonas phaseoli, Xanthomonas pisi,* and *Xanthomonas translucens.* Studies have indicated that production of the heteropolysaccharides is a characteristic trait of all members of the genus Xanthomonas. It has been found, however, that certain species of the genus produce the heteropolysaccharides with particular efficiency and are therefore more attractive for synthesizing the polymers than are others. *Xanthomonas begoniae, Xanthomonas campestris, Xanthomonas incanae* and *Xanthomonas pisi* are particularly outstanding in this respect and are therefore generally preferred in the process of the invention.

The innoculum employed for fermenting the carbohydrates to produce the heteropolysaccharide may be prepared and stored in preparation tank 33 provided with agitator 34. In the system shown in the drawing, the preparation tank is connected to mixing vessel 11 by line 35 containing valve 36 in order to permit the transfer of fermentation medium from the mixing vessel to the innoculum preparation tank. The bacterial culture employed may be added to the preparation tank through line 37 containing valve 38. The innoculum is prepared by permitting the bacteria to grow upon a small amount of fermentation medium previously sterilized within the preparation tank by bubbling live steam into it through line 39 containing valve 40. Sterilized air necessary for growth of the bacteria is introduced into the preparation tank through line 41. A sparger or similar device may be provided near the bottom of the tank in order to assure distribution of the air throughout the medium and thus provide the necessary aerobic conditions. The fermenting medium is provided with gentle agitation during the incubation period. The air introduced into the medium will often provide sufficient agitation. The rate at which the innoculum is produced is controlled in order to maintain a steady supply for use in the main fermentation process. The innoculum thus prepared is withdrawn from the preparation tank through line 42 containing valve 43 and is circulated by means of pump 44 through line 45 into the fermentation vessel 32.

Air free of bacteria and other organisms is injected into the fermentation vessel through line 46 and an associated sparger or similar device in order to provide the aerobic conditions required for growth of the bacteria in the sterile medium. The agitation required may be provided by means of a suitable agitator 47. As fermentation takes place, the pH of the medium in vessel 32 will normally decrease due to the production of acidic products by the bacteria. To control the pH, a portion of the medium is withdrawn from the vessel through line 48 containing valve 49 and is circulated by means of pump 50 through line 51 containing valve 52 into a conventional pH meter 53. Here the acidity of the medium is measured. The fluid circulated through the meter is returned to the fermentation vessel through line 54 containing valve 55. The meter is connected electrically or hydraulically to an automatic valve 56 in line 57 through which sodium hydroxide or a similar basic reagent is added. The amount of base introduced into the medium is controlled to maintain a pH value between about 6 and about 7.5. Values between about 6.5 and about 7.2 are preferred. The amount of sodium hydroxide or other base required to maintain such values will depend upon the concentration of the base employed, the volume of fermentate and the stage of the fermentation reaction. In lieu of an external pH meter as shown, an electrode assembly suitable for direct emersion within the fermentation vessel may be utilized. Commercial pH measuring and controlling equipment suitable for use in the process is available from various commercial sources and will therefore be familiar to those skilled in the art. The pH may also be controlled to some extent by the addition of a buffer to the fermentation medium. A solution of dipotassium acid phosphate or a similar material may be employed for this purpose. In selecting a buffer, care should be taken to assure that the material utilized has no adverse effect upon the bacteria or their production of the heteropolysaccharide.

Te fermentation in vessel 32 is generally carried out at a temperature within the range between about 70° and about 100° F., preferably between about 75° F. and 85° F. As the reaction progresses, the viscosity of the medium increase rapidly due to the formation of the heteropolysaccharide. The reaction may be halted after the viscosity of the medium has reached a value of about 70 centipoises or higher, as determined by testing the fermentation in 1:6 dilution with distilled water in a Brookfield viscometer at 80° F. The fermentation may be carried out over a period ranging from about 36 hours to about 72 hours, although the necessary viscosity in a well controlled process will generally be attained after about 48 hours. On reaching the desired viscosity, the fermentate containing the heteropolysaccharide is withdrawn from vessel 32 and circulated to the recovery stage of the process through line 58 containing valve 59. The solution thus withdrawn generally contains from about 0.5 to about 4 weight percent of the heteropolysaccharide and normally has a viscosity within the range between about 500 and about 50,000 centipoises. The fermentate is normally a dull yellow color and contains, in addition to the heteropolysaccharide, the bacterial cells and unconverted carbohydrate from the medium.

The recovery stage of the process shown in the drawing includes a rotary filter, a centrifuge or a similar device 60 into which the fermentate from line 58 is introduced. A dilute aqueous solution containing polyvalent cations is added through line 61 in order to facilitate the separation of the polymer solution from the bacterial cells and other insoluble material. The solution employed will preferably be a dilute salt solution. Suitable salts include barium acetate, barium chloride, barium iodide, barium perchlorate, cadmium acetate, cadmium chlorate, cadmium nitrate, calcium acetate, calcium bromate, calcium bromide, calcium iodide, calcium lactate, calcium nitrate, calcium perchlorate, cupric chloride, lead acetate, lead chlorate, magnesium acetate, magnesium bromide, magnesium chloride, magnesium nitrate, magnesium sulfate, manganese bromide, nickel chloride, strontium chloride, zinc acetate, zinc bromide, zinc chlorate, zinc chloride, zinc iodide, zinc nitrate, zinc sulfate and the like. Tests have shown that the addition of such salts to the fermentate in concentrations in excess of about 0.05 percent by weight significantly reduces the time required to filter or centrifuge out the cells and other solids and thus lowers the cost of recovering the heteropolysaccharide. The addition of a salt or other compound containing divalent cations in a concentration between about 0.1 percent and about 10 percent, based upon the weight of the fermentate is preferred. In lieu of adding a dilute salt solution through line 61 as shown, salts or other compounds yielding bivalent cations in aqueous solution may be dissolved in the fermentate. Concentrated or saturated salt solutions may also be employed. The use of a dilute solution is preferred, however, because the water contained therein reduces the fermentate viscosity and thus further promotes rapid filtration.

The filter cake containing bacterial cells and other solids from the fermentate may be washed with water to remove any heteropolysaccharide solution entrapped within the cake. The solids discharged from the filter as indicated at line 62 may be heated to kill any bacteria present or treated with a bactericide and disposed of as a by-product. The diluted heteropolysaccharide solution recovered from the filtration step is discharged through line 63 containing valve 64 and circulated by means of pump 65 to reaction vessel 66.

Following filtration or centrifugation of the fermentate to remove bacterial cells and other insolubles, a basic reagent is added to the resulting heteropolysaccharide solution in vessel 66 through line 68 in order to raise the pH and recover the polymer. At high pH levels and in the presence of polyvalent cations, heteropolysaccharide reaction products which are insoluble and can be recovered as a precipitate are formed. Suitable alkaline reagents include sodium hydroxide, potassium hydroxide, calcium hydroxide, calcium oxide, ammonium hydroxide, hydroxylamine or the like. The use of ammonium hydroxide is generally preferred because it will decompose at elevated temperatures and can thus be removed from the polymer during the subsequent drying step. This minimizes the amount of added constituents present in the final product and hence assures higher purity than can generally be obtained when sodium hydroxide or the like is used. If the addition of polyvalent cations is omitted in the initial stage of the recovery process, precipitation of the polymer can be effected later by adding a polyvalent salt and a base such as sodium hydroxide or ammonium hydroxide or, alternately, by adding a base such as calcium oxide or calcium hydroxide which will supply the necessary polyvalent cations and raise the pH at the same time.

The concentrations in which the reactants employed for precipitation of the heteropolysaccharide are added to vessel 67 will depend primarily upon the particular reactants selected and the pH of the initial solution. Studies have shown that the polyvalent cations need be present in the solution in only small amounts and that salt concentrations within the range between about 0.05 and about 1.0 percent by weight are generally sufficient to effect precipitation if the pH is properly controlled. If calcium hydroxide, calcium oxide, or a similar basic material is utilized to provide the polyvalent cations and at the same time increase the pH, quantities in excess of 1.0 percent by weight may be necessary in some cases, particularly if the initial pH is low. In like manner, the amount of ammonium hydroxide, sodium hydroxide or the like that must be added to a solution in which the polyvalent cations are already present is generally small. Precipitation normally takes place at pH values between about 8.5 and about 12, depending upon the particular cations in the solution, and hence only a small quantity of alkali or alkaline solution may be necessary. This again depends upon the initial pH and the reagent selected, however. The precipitate generally settles quickly. An agitator 69 may be provided to promote mixing of the reactants and maintain the insoluble product in suspension until it can be recovered.

A slurry containing the precipitate is withdrawn from vessel 66 through line 70 containing valve 71 and is transferred to a filter, centrifuge or a similar separation device 72. Here the liquid phase is withdrawn through line 73; while the filter cake containing the heteropolysaccharide is transferred as indicated by line 74 to a rotary dryer, tunnel dryer or similar device 75. The cake may be washed with alkaline water, preferably with an ammonium hydroxide solution, during the filtration step if desired. The dry polymer, readily soluble in aqueous solutions having pH values below about 8.5, is withdrawn from the dryer as indicated at line 76.

The process of the invention is further illustrated by the following examples.

EXAMPLE I

An aqueous solution of a heteropolysaccharide produced by the action of *Xanthomonas campestris* on sugar which contained bacterial cells, unconverted sugar and other materials from the fermentation process was divided into four samples. The first of these samples was filtered in a pressure filter under a differential of 100 pounds per square inch in order to remove the cells and other insoluble materials. It was found that the viscous solution filtered very slowly and that about 30 minutes was required for 325 milliliters of the solution to pass through the filter medium. This illustrates the difficulties normally encountered in the initial filtration or centrifugation step following fermentation of a carbohydrate to produce the heteropolysaccharide.

A second sample of the viscous solution referred to above was treated to improve filterability by adding calcium chloride in a concentration of 0.1 percent by weight. This sample was then filtered through a clean filter medium having the same porosity as that employed earlier. A pressure differential of 100 pounds per square inch was applied as in the earlier cases. It was found that only three minutes and five seconds were required to filter 350 milliliters of the heteropolysaccharide solution in the presence of the calcicm chloride. This tenfold reduction in filtration time represents a significant improvement in the recovery stage of the heteropolysaccharide manufacturing process and may permit a substantial reduction in filtration costs.

Additional tests with the third and fourth samples referred to above showed that the time required for filtration could be reduced even further by empolying the calcium chloride in higher concentrations. When 2.8 percent by weight of the salt was used, the time required to filter 350 milliliters of the heteropolysaccharide solution under a pressure differential of 100 pounds per square inch through a medium of the same porosity was reduced to about 35 seconds. The use of the salt in a concentration of 5.7 percent by weight gave a filtration period of about 60 seconds under the same conditions. Similar results are obtained with other polyvalent salts in equivalent concentrations. The addition of a dilute solution containing polyvalent cations to the fermentate prior to the initial filtration or centrifugation step is therefore a preferred procedure in the process of the invention.

EXAMPLE II

In order to demonstrate the precipitation of the heteropolysaccharide with polyvalent cations at high pH levels, heteropolysaccharide solutions containing polyvalent cations in concentrations similar to that of the solution recovered from the initial filtration or centrifugation step of the process were prepared. These solutions were made up by first adding a heteropolysaccharide derived from sugar by the action of *Xanthomonas campestris* to distilled water in a concentration of 0.43 percent by weight. Dilute calcium chloride, calcium nitrate, magnesium chloride and magnesium sulfate solutions were prepared by adding each salt to a separate container of distilled water in a concentration of 4.0 percent by weight. Twenty-five milliliters of each salt solution was then added to a separate 350 milliliter sample of the heteropolysaccharide solution. No apparent change took place upon addition of the salt solutions.

Following preparation of the heteropolysaccharide solutions containing polyvalent cations as described above, a small amount of aqueous sodium hydroxide solution was added to each sample in order to raise the pH. In each case, a soft bulky precipitate of the heteropolysaccharide formed immediately. These results demonstrate that the polymer can readily be precipitated from alkaline solutions containing polyvalent cations and show that the use of methanol, ethanol, quaternary ammonium compounds and similar organic reagents is not essential for recovering the heteropolysaccharide. Since alkaline solutions containing calcium ions or similar polyvalent cations are much less expensive than the organic reagents, the process of the invention permits production and recovery of the polymer at costs well below those incurred in prior art processes.

EXAMPLE III

As pointed out earlier, the heteropolysaccharide may if desired be precipitated by the direct addition of an alkaline solution containing polyvalent cations, rather than by first adding the cations and later adding a base to raise the pH. This is shown by the results of a test in which calcium hydroxide was added to an aqueous solution containing 0.43 weight percent of a heteropolysaccharide produced by the action of *Xanthomonas campestris* on a carbohydrate. One gram of the calcium hydroxide was dissolved in 25 milliliters of distilled water and the resulting solution was stirred into 350 milliliters of the polymer solution. The heteropolysaccharide immediately precipitated. The solution containing the precipitate was then acidified by adding hydrochloric acid. At a pH of about 8.5, the heteropolysaccharide redissolved. These results show that a single compound can be used both as an alkalizing agent and as a source of polyvalent cations. They also demonstrate the feasibility of repeatedly precipitating and redissolving the polymer during the recovery process by the alternate use of basic and acidic solutions.

What is claimed is:

1. A process for precipitating a heteropolysaccharide produced by the action of bacteria of the genus Xanthomonas on a carbohydrate from an aqueous solution containing said heteropolysaccharide bacteria and other insoluble material which comprises
   (a) adding a water-soluble salt yielding polyvalent cations to said aqueous solution, said salt being added in concentration sufficient to precipitate the heteropolysaccharide on raising the pH of said solution to an alkaline value in excess of about 8.5,
   (b) removing said insoluble materials from said solution,
   (c) and thereafter adding an alkaline agent to said solution in a concentration sufficient to raise the pH to said alkaline value and precipitate said heteropolysaccharide.

2. A process as defined by claim 1 wherein said salt is calcium chloride.

3. A process as defined by claim 1 wherein said salt is magnesium sulfate.

4. A process for isolating a heteropolysaccharide produced by fermenting a carbohydrate with bacteria of the genus Xanthomonas from the fermented aqueous solution containing the heteropolysaccharide and bacteria and other insolubles which comprises
   (a) adding a salt yielding polyvalent cations capable of precipitating the heteropolysaccharide at highly alkaline pH values to said solution in a concentration in excess of about 0.05% by weight,
   (b) mechanically separating insoluble constituents from the solution,
   (c) adding an alkaline agent to said solution in a concentration sufficient to raise the pH to a highly alkaline value and precipitate said heteropolysaccharide,
   (d) and thereafter recovering the precipitate.

5. A process as defined by claim 4 wherein said alkaline reagent is sodium hydroxide.

6. A process as defined by claim 4 wherein said alkaline reagent is ammonium hydroxide.

7. A process for recovering a heteropolysaccharide produced by fermenting a carbohydrate with the bacteria *Xanthomonas campestris* from the fermented aqueous solution containing the heteropolysaccharide and bacteria and other insolubles which comprises
   (a) adding a water-soluble calcium salt to said solution in a concentration in excess of about 0.05% by weight sufficient to precipitate said heteropolysaccharide on raising the pH of said solution to an alkaline value in excess of about 8.5,
   (b) removing bacterial cells and other insolubles from the solution,
   (c) adding a base to said solution in a concentration sufficient to raise the pH to an alkaline value in excess of about 8.5 and precipitate said heteropolysaccharide,
   (d) and recovering the precipitate.

8. A process as defined by claim 7 wherein said salt is added to said fermentate in a concentration between about 0.1 and about 10 percent by weight.

9. A process as defined by claim 7 wherein said salt is calcium chloride and said base is ammonium hydroxide.

10. A process for the production of a dry heteropolysaccharide derived by the fermentation of a carbohydrate with bacteria of the genus Xanthomonas which comprises
    (a) preparing a fermented aqueous solution containing said heteropolysaccharide and the bacteria,
    (b) adding a salt yielding divalent cations capable of precipitating the heteropolysaccharide at highly alkaline pH values to said solution in a concentration sufficient to precipitate said heteropolysaccharide on raising the pH of said solution,
    (c) removing bacterial cells from the solution,
    (d) raising the pH of said solution to an alkaline value sufficient to precipitate the heteropolysaccharide,
    (e) and thereafter drying the precipitate.

11. A process as defined by claim 10 wherein said salt is a calcium salt and the pH of said solution is raised by the addition of ammonium hydroxide.

12. A process for recovering a heteropolysaccharide produced by the action of bacteria of the genus Xanthomonas on a carbohydrate from an aqueous solution containing said heteropolysaccharide, bacteria and other insoluble materials and a water-soluble compound yielding polyvalent cations in a concentration sufficient to precipitate the heteropolysaccharide at highly alkaline pH values which comprises
    (a) removing said insoluble materials from said aqueous solution,
    (b) raising the pH of said aqueous solution to a highly akaline value sufficient to precipitate said heteropolysaccharide and
    (c) thereafter recovering the precipitate.

References Cited

UNITED STATES PATENTS

| | | | |
|---|---|---|---|
| 3,232,929 | 2/1966 | McNeely et al. | 195—31 |
| 3,000,790 | 9/1961 | Jeanes et al. | 195—31 |
| 3,020,206 | 2/1962 | Patton et al. | 195—31 |
| 3,020,207 | 2/1962 | Patton | 195—31 |
| 3,054,689 | 9/1962 | Jeanes et al. | 106—208 |
| 3,096,293 | 7/1963 | Jeanes et al. | 252—316 |

ALVIN E. TANENHOLTZ, *Primary Examiner.*

A. LOUIS MONACELL, D. M. STEPHENS, *Examiners.*